US012580981B2

(12) United States Patent (10) Patent No.: US 12,580,981 B2
Zhang et al. (45) Date of Patent: Mar. 17, 2026

(54) NETWORK LOAD BALANCING

(71) Applicant: Dell Products L.P., Round Rock, TX (US)

(72) Inventors: Weibing Zhang, Beijing (CN); Victor Lei Gao, Beijing (CN); Donglei Wang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 42 days.

(21) Appl. No.: 18/742,932

(22) Filed: Jun. 13, 2024

(65) Prior Publication Data

US 2025/0323971 A1 Oct. 16, 2025

(30) Foreign Application Priority Data

Apr. 12, 2024 (CN) .......................... 202410444762.4

(51) Int. Cl.
G06F 15/173 (2006.01)
H04L 67/1008 (2022.01)
(52) U.S. Cl.
CPC ................................ H04L 67/1008 (2013.01)
(58) Field of Classification Search
None
See application file for complete search history.

(56) References Cited

U.S. PATENT DOCUMENTS 12,405,836 B1 * 9/2025 Sathe .................. H04L 67/1008

OTHER PUBLICATIONS

R. Braden, FTP Data Compression, 1973-03-08, UCLA/CCN, RFC 468, whole document (Year: 1973).*
"SMB compression" Microsoft. [https://learn.microsoft.com/en-us/windows-server/storage/file-server/smb-compression], Oct. 25, 2024, retrieved Aug. 11, 2025, 8 pages.
R. Braden. UCLA/CCN. "FTP Data Compression" Network Working Group Request for Comment: 468, NIC: 14742, [https://datatracker.ietf.org/doc/html/rfc468], Mar. 8, 1973, 7 pages.
"Sftp(1)—Linux manual page" Man7.org. [https://www.man7.org/linux/man-pages/man1/sftp.1.html], retrieved Aug. 11, 2025, 10 pages.

* cited by examiner

*Primary Examiner* — Wing F Chan
*Assistant Examiner* — Andrew Woo
(74) *Attorney, Agent, or Firm* — Amin, Turocy & Watson, LLP

(57) ABSTRACT

The subject technology relates to load balancing. An example method includes determining, in response to a difference between resource consumption of a first node in a group of nodes and resource consumption of another node in the group of nodes exceeding a first threshold, whether a proportion difference between a proportion of compressed data in I/O data of the first node and a proportion of compressed data in I/O data of another node in the group of nodes exceeds a second threshold. When the proportion difference exceeds the second threshold, a workload is selected from a first group of workloads on the first node based on characteristics of compressed data in respective I/O data of the first group of workloads, and the workload is moved to a second node in the group of nodes, system load imbalance caused by protocol layer data compression is alleviated in a multi-node system.

20 Claims, 6 Drawing Sheets

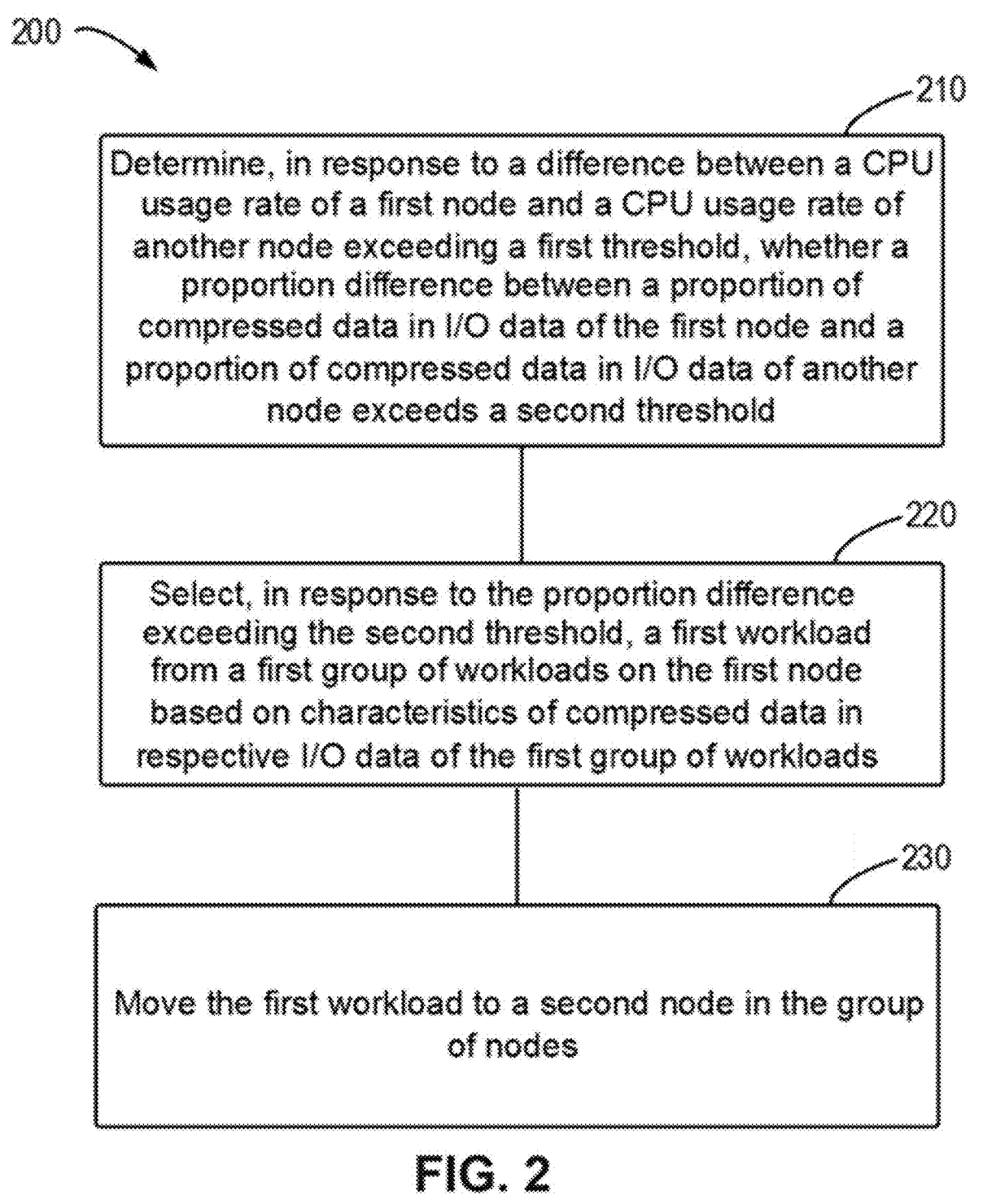

200

210

Determine, in response to a difference between a CPU usage rate of a first node and a CPU usage rate of another node exceeding a first threshold, whether a proportion difference between a proportion of compressed data in I/O data of the first node and a proportion of compressed data in I/O data of another node exceeds a second threshold

220

Select, in response to the proportion difference exceeding the second threshold, a first workload from a first group of workloads on the first node based on characteristics of compressed data in respective I/O data of the first group of workloads

230

Move the first workload to a second node in the group of nodes

FIG. 2

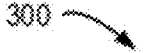
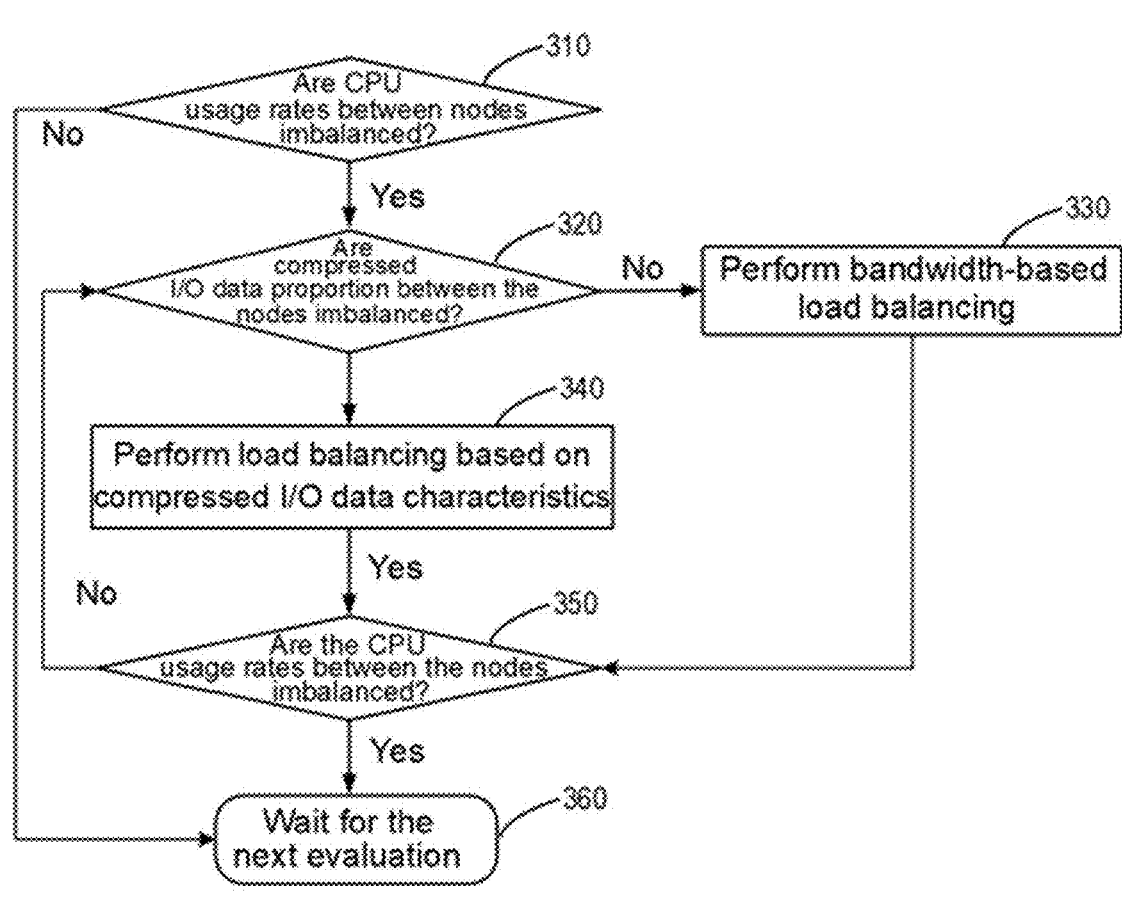
FIG. 3

500A

500B

NETWORK LOAD BALANCING

RELATED APPLICATION

The present application claims the benefit of priority to Chinese Patent Application No. 202410444762.4, filed on Apr. 12, 2024, which application is hereby incorporated into the present application by reference herein in its entirety.

TECHNICAL FIELD

The present disclosure relates to the field of computer network technologies, and, e.g., to load balancing.

BACKGROUND

In a storage system, compression is one of key technologies to improve data efficiency, which attempts to reduce the size of data blocks through calculation of a compression process. The data transmission between a client and the storage system can also utilize the compression technology. A plurality of file sharing protocols, such as a File Transfer Protocol (FTP), a Secure File Transfer Protocol (SFTP), and a Server Message Block (SMB) protocol, support protocol layer compression to reduce the amount of data transmitted over the network.

The protocol layer compression supports compressing data to be transmitted before transmitting the data over the network. Compared with transmitting raw data, transmitting compressed data requires a lower network bandwidth, thus helping reduce bandwidth consumption and save data transmission time, and can improve the throughput of actual data transmission.

SUMMARY

One or more example embodiments of the present disclosure provide a solution for load balancing.

In a first example embodiment of the present disclosure, a method for load balancing is provided. The method includes: determining, in response to a difference between a central processing unit (CPU) usage rate of a first node in a group of nodes and a CPU usage rate of another node in the group of nodes exceeding a first threshold, whether a proportion difference between a proportion of compressed data in I/O data of the first node and a proportion of compressed data in I/O data of another node in the group of nodes exceeds a second threshold, selecting, in response to the proportion difference exceeding the second threshold, a first workload from a first group of workloads on the first node based on characteristics of compressed data in respective I/O data of the first group of workloads, and moving the first workload to a second node in than the group of nodes.

In a second example embodiment of the present disclosure, an electronic device is provided. The electronic device includes a processor and a memory that is coupled to the processor and has instructions stored therein. The instructions, when executed by the processor, cause the electronic device to execute actions including: determining, in response to a difference between a CPU usage rate of a first node in a group of nodes and a CPU usage rate of another node in the group of nodes exceeding a first threshold, whether a proportion difference between a proportion of compressed data in I/O data of the first node and a proportion of compressed data in I/O data of another node in the group of nodes exceeds a second threshold, selecting, in response to the proportion difference exceeding the second threshold, a first workload from a first group of workloads on the first node based on characteristics of compressed data in respective I/O data of the first group of workloads, and moving the first workload to a second node in than the group of nodes.

In a third example embodiment of the present disclosure, a computer program product is provided. The computer program product is tangibly stored on a computer-readable medium and includes machine-executable instructions. The machine-executable instructions, when executed, cause a machine to perform determining, in response to a difference between a central processing unit (CPU) usage rate of a first node in a group of nodes and a CPU usage rate of another node in the group of nodes exceeding a first threshold, whether a proportion difference between a proportion of compressed data in I/O data of the first node and a proportion of compressed data in I/O data of another node in the group of nodes exceeds a second threshold, selecting, in response to the proportion difference exceeding the second threshold, a first workload from a first group of workloads on the first node based on characteristics of compressed data in respective I/O data of the first group of workloads, and moving the first workload to a second node in than the group of nodes.

It should be noted that this Summary is provided to introduce a selection of concepts in a simplified manner, which will be further described in the Detailed Description below. This Summary is neither intended to identify key features or major features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent, where

FIG. 2 shows a flow chart of an example method for load balancing according to some embodiments of the present disclosure;

FIG. 3 shows a flow chart of an example method for load balancing according to some embodiments of the present disclosure;

In all the drawings, the same or similar reference numerals represent the same or similar elements.

DETAILED DESCRIPTION

Figure 1:
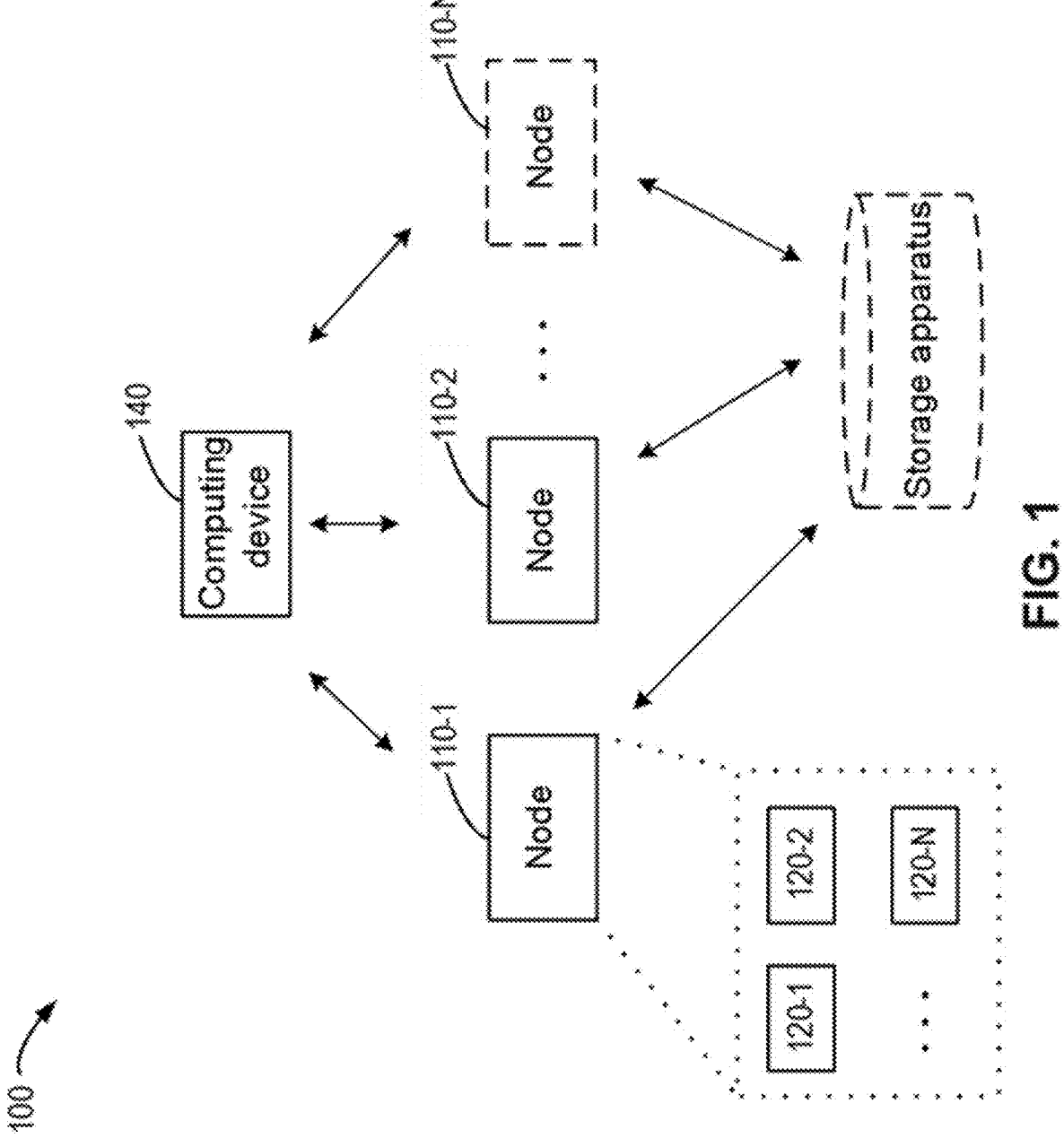
FIG. 1 shows a schematic diagram of an example environment 100 in which a plurality of embodiments of the present disclosure can be implemented.

Example embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." Relevant definitions of other terms will be given in the description below.

As used herein, depending on the context, a value "meeting a threshold" may, depending on the context, refer to the value being greater than the threshold, greater than or equal to the threshold, equal to the threshold, less than or equal to the threshold, less than the threshold, and the like.

Protocol layer compression supports compressing data to be transmitted before transmitting the data over the network based on a corresponding protocol. The protocol layer compression helps reduce bandwidth consumption, save data transmission time, and improve the throughput of actual data transmission. A plurality of file sharing protocols, such as FTP, SFTP, and SMB, support connection-level protocol layer compression. These protocols automatically negotiate a compression/decompression protocol between a sender and a receiver of data (such as a server and a client), so as to reduce the size of all data transmitted through a connection by compressing the data to be transmitted. For example, whether to compress the data to be transmitted may be set for each connection between the server and the client.

The FTP uses a "COMpress" subcommand to set a data transmission mode to a compressing mode. The SFTP uses a "compression (-C)" switch to enable the connection-level compression. SMB compression introduced in SMB3 may be enabled through configurations of the client and the server. As a new function in the SMB3, the SMB compression may be performed during, for example, mapping sharing or using a tool such as Xcopy, Robocopy, or PowerShell on a Windows system.

The SMB compression allows the client to request the server to compress data before sending the data over the network. If the server enables the SMB compression, it may accept the request and transmit compressed data. If the server does not enable the SMB compression or the client chooses not to use the SMB compression, the server may normally process I/O requests that do not involve the transmission layer compression. Similarly, negotiations may be performed between the client and the server, so that the client compresses the data before sending the data to the server. The data receiver may then perform protocol layer decompression on the received data, thereby obtaining the data actually intended to be transmitted.

When network bandwidth becomes a bottleneck of data transmission, the protocol layer compression will significantly shorten the file replication time and improve the data transmission speed. For example, the bandwidth and the throughput of a client network are usually limited and may sometimes cause congestion. In addition, even on a high-speed network, the bandwidth may still become a bottleneck due to a network connection speed slower than the speed of a backend disk (such as a non-volatile memory (NVMe) standard disk array used by the storage system).

In such a case, the protocol layer can save the amount of data that must be transmitted over the network. According to a definition of a compression ratio=the original size of the data/the compressed size of the data, the higher the compression ratio of data of the same size, the smaller the amount of compressed data, resulting in less bandwidth consumption and less transmission time when transmitted. On the other hand, the transmission layer compression brings additional CPU cycles and increases the CPU usage rate of the system, as the system attempts to compress and decompress files when the files are transmitted over the network.

When the protocol layer compression is enabled on the server side, file compression may always be attempted by default when the client requests data. However, not all clients support the protocol layer compression, or some clients may choose not to use the protocol layer compression. Therefore, it is uncertain whether the data transmitted through the connection between the server and the client is compressed.

In a multi-node system, a client may establish a connection with a certain node. In some embodiments, each node may include a plurality of virtual servers, and each virtual server may establish a plurality of connections with a plurality of clients. Due to the uneven distribution of data that has undergone the protocol layer compression in the connection/virtual server-level I/O data, the system load between nodes may become unbalanced. This may lead to hotspots in the system, and it is difficult to fully utilize resources such as CPU and bandwidth of the system, thereby affecting the system performance and reducing the user experience.

A traditional load balancing mechanism will be ineffective for load unbalancing of nodes caused by uneven distribution of compressed data in I/O streams across a plurality of nodes, as it lacks knowledge about protocol layer data compression characteristics. Moreover, a traditional bandwidth-based balancing process may lead to further imbalance. This is because a workload that has undergone the protocol layer compression may use less bandwidth, but it brings a heavy load to the backend. With the increasing adoption of protocol layer compression such as SMB compression in multi-node systems, an improved solution is needed to balance the workload of the multi-node system.

To at least partially solve the above problems and other potential problems, the embodiments of the present disclosure provide a solution for load balancing. When load balancing is performed between a plurality of nodes in a system (such as a software defined Network Attached Storage (SD-NAS) system), the solution takes into account the characteristics of data undergone the protocol layer compression in the system I/O. These characteristics may include a proportion of compressed data in I/O data, a compression ratio of the compressed data, and the like.

Specifically, if an imbalance in a CPU usage rate is detected between various nodes in the system, for a node with an excessively high CPU usage rate, the solution may further compare a proportion of data undergone the protocol layer compression in the I/O data of the node to determine whether there is an imbalance in an I/O compressed data proportion of the node with respect to another node. If the I/O data of the node includes an excessively high proportion of compressed data, a workload may be selected from a group of workloads of the node (such as a plurality of virtual servers) based on characteristics of the data undergone the protocol layer compression in their respective I/O data of the group of workloads, and the selected workload may be moved to another node. In some embodiments, the solution may be used in combination with bandwidth-based load balancing to achieve load balancing by moving (for example, connection-level or virtual server-level) workloads between nodes, thereby alleviating the system load imbalance.

Compared with the traditional CPU/bandwidth-based load balancing method, the solution can alleviate the load imbalance caused by uneven distribution of data undergone the protocol layer compression in I/O of different nodes, avoid hotspots in a multi-node storage system, and improve the overall system performance, as balanced I/O can better utilize the bandwidth and the CPU.

For the sake of illustration, in the description herein, a multi-node storage system that supports SMB compression may be used as an example. However, it should be understood that the embodiments of the present disclosure are also applicable to other multi-node systems that support other protocol layer compressions. For simplicity, unless otherwise explicitly stated, when referring to "compressed data" or similar expressions herein, it refers to data undergone protocol layer compression before transmission over a network, regardless of whether the data is expected to be transmitted originally in a compressed format.

FIG. 1 shows a schematic diagram of an example environment 100 in which a plurality of embodiments of the present disclosure can be implemented. As shown in FIG. 1, the environment 100 includes two or more nodes 110-1, 110-2, . . . , and 110-N (individually or collectively referred to as nodes 110) of the same system. Each node 110 has resources related to processing, memory, and the like, and can act as a server side to host one or more network services, such as a network storage service, provided to clients.

A (plurality of) client(s) (not shown) may establish a connection with a certain node 110 to request a service. For the connection, an I/O stream for transmitting data may be generated. In some embodiments, a single node 110 may run a plurality of logical virtual servers to, for example, differentiate and process different types of services. For example, the node 110-1 may include a plurality of virtual servers 120-1, 120-2, and 120-M. For example, these virtual servers may be based on the container technology. In such an embodiment, each virtual server may establish connections with a plurality of clients.

In some embodiments, for example, in a multi-node storage system, a plurality of nodes 110 share an underlying physical storage apparatus 130. Each node 110 is responsible for a connection between the frontend and the client. Then, involved data is processed in the backend and deposited into the storage apparatus 130, and/or read from the storage apparatus 13—for responding to the client request. The storage apparatus 130 may be implemented by using any known or future developed storage technology, such as a redundant array of independent disks (RAID).

The node 110 may support protocol layer compression. By default, the node 110 will compress data before transmitting the data, and decompress the data upon receiving the compressed data. The compression and/or decompression operations result in additional backend CPU overheads. However, the node 110 may provide services to a plurality of clients, and only some clients may support and choose to use the protocol layer compression.

When a specific connection is established, the node 110 may automatically negotiate with the client to determine whether to use the protocol layer compression for the connection. When the original amount of traffic to be transmitted is the same, a client that does not use the protocol layer compression will generate an I/O stream with a higher network overhead, while a client that uses the protocol layer compression for SMB will generate an I/O stream with a higher CPU overhead. Due to the dynamic change in the connection between the client and the node 110, the distribution of compressed and uncompressed I/O flows between a plurality of nodes 110 may become uneven.

The environment 100 further includes a computing device 140. The computing device 140 may perform various actions according to the embodiments of the present disclosure. For example, the computing device 140 may collect resource overhead data (such as CPU, bandwidth, and disk overheads) of the various nodes 110, and characteristic data of compressed data in their I/O data. The characteristic data may include factors such as a proportion of compressed data in all I/O data and a compression ratio of the compressed data. The data may be recorded at each connection level and aggregated at the virtual server level and the node level.

The computing device 140 may further perform load balancing for the plurality of nodes 110 according to the embodiments of the present disclosure, and move a portion of the workloads on a certain node 110 to another node 110. When performing the load balancing, the computing device 140 will consider the characteristics of the compressed data in the I/O data, which will be described in more detail in the following text.

The computing device 140 may exist and be distributed in any suitable form, for example, as an independent individual device, a distributed device, a virtual device, and the like. In some embodiments, the computing device 140 may be a control node of the system where the node 110 is located. For clarity, the computing device 140 is shown as an entity separate from the node 110. However, in some embodiments, one of the nodes 110 may act as a master node to coordinate operations of a plurality of nodes 110 together. In this case, the node 110 may perform various methods according to the embodiments of the present disclosure.

The architecture and functions in the example environment 200 are described only for example purposes, without implying any limitation to the scope of the present disclosure. There may also be other devices, systems, or components that are not shown in the example environment 200. In addition, the embodiments of the present disclosure may also be applied to other environments having different structures and/or functions.

FIG. 2 shows a flow chart of an example method 200 for load balancing according to some embodiments of the present disclosure. The example method 200 may be performed by, for example, the computing device 140 as shown in FIG. 1. It should be understood that the method 200 may also include additional actions not shown, and the scope of the present disclosure is not limited in this regard. The method 200 will be described in detail below with reference to the example environment 100 in FIG. 1.

At 210, it is determined, in response to a difference between a CPU usage rate of a first node in a group of nodes and a CPU usage rate of another node in the group of nodes exceeding a first threshold, whether a proportion difference between a proportion of compressed data in I/O data of the first node and a proportion of compressed data in I/O data of another node in the group of nodes exceeds a second threshold.

For example, in response to differences between the CPU usage rate of the node 110-1 and the CPU usage rates of other nodes in the nodes 110-2 to 110-N exceeding a preset threshold (for example, 30%), the computing device 140 may determine that the CPU usage rate of the node 110-1 is too high compared with other nodes, and there is a CPU usage imbalance between nodes.

In some embodiments, the computing device 140 compares the differences between a certain node and other nodes only when detecting that the usage rate of the node exceeds a usage threshold (for example, 80%). In this way, unnecessary load balancing performed on nodes while they still have sufficient CPU margin may be avoided.

When there is an imbalance in CPU usage rates between nodes, the computing device 140 may further determine whether a proportion of compressed data in I/O data of the node 110-1 with a high CPU usage rate and proportions of compressed data in I/O data of other nodes in the nodes 110-2 to 110-N exceed a preset proportion difference threshold. Therefore, the computing device 140 may determine whether there is an imbalance in the proportion of the compressed data in the I/O data of the node 110-1 with respect to other nodes. A specific value of the corresponding threshold may depend on implementation, which is not limited to the embodiments of the present disclosure.

In some embodiments, to determine the corresponding difference, the computing device 140 may record various usage data of the node 110, such as a CPU consumption rate and a bandwidth overhead for transmitting data. For the bandwidth overhead, the computing device 140 may record data reflecting the compressed data characteristics in I/O streams, including the sizes of uncompressed data, the sizes of compressed data, and the original sizes of the compressed data before compression transmitted by I/O requests associated with workloads on the various nodes.

For example, the computing device 140 may control the various nodes 110 to record their own data and collect the data from the various nodes 110. The computing device may then determine the proportion difference based on the sizes of uncompressed data, the sizes of compressed data, and the like recorded during a predetermined time period. For example, the computing device 140 may use a mean or another statistical value of the corresponding characteristics for comparison. For example, the computing device 140 may be used during a predetermined time period, depending on the specific implementation, and other variations of the above method may also be used.

At 220, a first workload is selected from a first group of workloads on the first node, in response to the proportion difference exceeding the second threshold, based on characteristics of compressed data in respective I/O data of the first group of workloads. These characteristics may include a compression ratio of the compressed data, a proportion of the compressed data in all data, and the like. For example, in response to a determination at 210 that a difference in a proportion of the compressed data in the I/O data of the node 110-1 with respect to other nodes exceeds a proportion difference threshold, the computing device 140 may perform load balancing based on protocol layer compression characteristics. For this purpose, the first workload is selected from the first group of workloads based on the characteristic of the compressed data in respective I/O data of the group of workloads running on the node 110-1.

For example, the computing device 140 may select, for example, a workload where compressed data accounts for a higher proportion of all data. In some embodiments, the computing device 140 may select a workload with a small I/O data volume but a high proportion of compressed data. Selecting the data with a small I/O data volume for subsequent movement may prevent sudden movement of a bandwidth consuming workload from impacting the resources of another node. On the other hand, the workload with a high proportion of compressed data will consume significant CPU resources during compression and decompression stages, and moving it to another node may help alleviate the load imbalance caused by the protocol layer compression.

The computing device may also consider the compression ratio of the compressed data when making choices. For the sake of clarity, description is made below based on the definition of data compression ratio-original data size/compressed data size. That is, a higher compression ratio of data represents a larger compression degree thereof.

In some embodiments, the computing device 140 may give preference to a workload with a lower compression ratio for compressed data (that is, original data corresponding to the data may be compressed to a lower extent) when the other conditions are the same. In the same volume of data transmission, the one with poor compressibility will consume more CPU resources during the compression and decompression stages, and moving it to another node may help alleviate the load imbalance caused by the protocol layer compression, as will be described in more detail with reference to Table 2 in the following text.

In some embodiments, the computing device 140 may assign certain weights to the above variables for calculation to select the corresponding workload. In some embodiments, the computing device 140 may further consider the variables described above or other variables when making a selection.

At 230, the first workload is moved to a second node in the group of nodes. For example, after a virtual server 120-1 is selected, the computing device 140 may move the virtual server 120 to the node 110-1. Therefore, a workload corresponding to the virtual server 120-1 will be borne by the node 110-2.

In some embodiments, the computing device 140 may select a workload by taking virtual servers as basic units. In this way, the workload selected and moved to the second node corresponds to a virtual server in a group of virtual servers. For example, the computing device 140 may select the virtual server 120-1 as the first workload and move it to the node 110-2.

For example, this situation may apply to a system such as an active-standby dual-node system or a similar system, wherein each virtual server runs on only one node. In such an embodiment, each virtual server has a corresponding IP address, and load balancing is performed at the exposed IP address level.

In other embodiments, the computing device 140 may select a workload by taking a connection between a client and a node as a basic unit. In this way, the workload selected and moved to the second node corresponds to the connection between the client and the first node. For example, in the manner described above, the computing device 140 may select a connection to a certain client based on characteristics of compressed data of I/O data on connections between the node 110-1 and a plurality of clients, and change the client to be connected to the node 110-2.

For example, this situation may apply to an active-active system or a similar system, wherein a certain type of request from a client to a server may be assigned to a plurality of nodes for execution. In such an embodiment, load balancing is performed at the individual client level. For case of explanation, description is made herein mainly by taking selecting and moving a virtual server as an example. However, it should be understood that the described actions are also applicable to selecting and moving a connection-level workload.

Using the method 200 to perform load balancing for the multi-node system can alleviate the load imbalance between nodes caused by the protocol layer compression, and avoid hotspots in the multi-node storage system, thereby improving the overall system performance.

In some embodiments, during each performing of load balancing based on the protocol layer compression characteristics, the computing device 140 may select a plurality of workloads (for example, selecting based on sorting of calculations or selecting by performing a plurality of rounds of iteration). For example, in addition to the virtual server 120-1 (as the selected first workload), the computing device 140 may further select a virtual server 120-2 (as a second workload) and move it to another node 110. In some embodiments, the computing device 140 may move the virtual server 120-2 to the node 110-N.

as described in combination with the method 200. The data from a given period of time may then be used as an input for load balancing evaluation of, for example, the method 300.

The usage data may be first recorded at the connection level. For compressed I/O data, the size of the compressed data for each I/O request and its original size before compression are recorded. For I/O data that does not involve protocol layer compression, the original size of uncompressed data is recorded. Table 1 shows an example data structure of a record, wherein a virtual data mobile device (VDM) used in a storage system is used as an example of the virtual server.

TABLE 1

| VDM *vdm, | //VDM identifier associated with data |
| uitn64_t compressed_io, | //size of compressed data transmitted in a compressed I/O |
| uint64_t raw_io_in_compression, | //original size of compressed data transmitted in a compressed I/O |
| uitn64_t uncompressed_io, | //size of data transmitted in an uncompressed I/O |

In some implementations, I/O data of the node 110-2 may be mainly non-compressed data, and therefore, there is no need to spend too much CPU resources on protocol layer compression/decompression. However, its bandwidth overhead may be significant. After the virtual server 120-1 is moved to the node 110-2, in response to a difference between bandwidth occupation of the node 110-2 and bandwidth occupation of another node in the nodes 110 exceeding a bandwidth difference threshold, the computing device 140 may further select a virtual server from the virtual servers running on the node 110-2 at this time and move it to another node 110. When the virtual server is selected, the computing device 140 may also consider characteristics of compressed data in I/O data of the various virtual servers. For example, the computing device may select a virtual server where there is no compressed data in an I/O stream or where a compressed data proportion is very low.

As a result, the computing device 140 may move a virtual server with compressed data dominating the I/O from the node 110-1 to the node 110-2, and move a virtual server mainly with non-compressed data dominating the main I/O from the node 110-2 to the node 110-1. In this way, both the CPU usage rate and the bandwidth consumption between the nodes are made more balanced.

In some embodiments, if a time length that elapses after the first workload is moved to the second node is less than a threshold time length (for example, indicating the same load balancing), the computing device 140 may exclude the first workload from candidates of the second workload. In this way, the newly moved workload may be prevented from being immediately moved again, and especially a loop that causes the workload to move back and forth between two nodes is avoided.

FIG. 3 shows a flow chart of an example method 300 for load balancing according to some embodiments of the present disclosure. The example method 300 may be an example implementation of the method 200, and may be performed by, for example, the computing device 140 shown in FIG. 1. It should be understood that the method 300 may also include additional actions not shown, and the scope of the present disclosure is not limited in this regard. The method 300 will be described in detail below with reference to the example environment 100 in FIG. 1.

In order to perform the method 300, the computing device 140 may record various usage data of nodes, including data associated with characteristics of compressed I/O streams, Furthermore, the actual amount of data processed in each connection is:

$$\text{total size of raw data} =$$

$$\text{size of uncompressed data} + \text{original size of compressed data}$$

For example, using an I/O counter of a protocol layer compression module, the proportion of the compressed data in the I/O data of the connection may be calculated as:

$$\text{compressed data proportion} = \frac{\text{original size of compressed data}}{\text{total size of raw data}}$$

Based on the above connection-level data, the computing device 140 may perform connection-level load balancing, as described earlier with reference to the method 200. The usage data may then be further aggregated at the virtual server level. For example, for a VDM having n connections, a proportion of compressed data in I/O data of the VDM may be calculated as:

$$VDM - \text{level compressed data proportion} =$$

$$\frac{\sum_{i=0}^{n} (\text{original size of compressed data})_i}{\sum_{i=0}^{n} (\text{total size of raw data})_i}$$

Similarly, for a node including m VDMs, a proportion of compressed data in I/O data of the node may be calculated as:

$$\text{node} - \text{level compressed data proportion} =$$

$$\frac{\sum_{i=0}^{m} (\text{original size of } VDM - \text{level compressed data})_i}{\sum_{i=0}^{m} (\text{total size of } VDM - \text{level raw data})_i}$$

It should be understood that the above data structure and the calculation of related metrics are only an example. Depending on the specific implementation, other variations of data structure and metric definitions may also be used. Furthermore, the computing device 140 may perform the method 300 at predetermined intervals (for example, daily, weekly, or another time period depending on system characteristics).

The method 300 starts at 310, where the computing device 140 first determines whether there is an imbalance between CPU usage rates of a group of nodes stored in the system based on the data recorded in a given time period (such as data since the last evaluation). For example, the computing device 140 may determine that the usage rate of a certain node exceeds a usage rate threshold, and a difference between usage rates of the node and another node in the system exceeds a corresponding difference threshold. In this case, the computing device 140 may determine that the CPU usage rates of the various nodes are imbalanced. If there is no imbalance in the CPU usage rates of the various nodes, the method 300 ends at 360, and the computing device 140 will wait for the next evaluation.

If the CPU usage rates of the various nodes are imbalanced, the method 300 proceeds to 320. Here, as mentioned earlier in combination with 210, the computing device 140 may determine whether there is an imbalance in proportions of compressed I/O data between the nodes. If there is no such imbalance, the method 300 proceeds to 330, and the computing device 140 may perform bandwidth-based load balancing. For example, the computing device 140 may select a workload with lower bandwidth consumption to a node with lower total bandwidth occupation. Then, the method 300 proceeds to 350, and the computing device 140 performs the next round of load balancing status evaluation.

It should be understood that the method 300 may further include an evaluation of bandwidth consumption status and a subsequent load balancing action for a node with excessive bandwidth consumption. For example, as mentioned earlier in combination with the method 200, if there is also an imbalanced distribution of compressed I/O between the nodes, a certain node with excessively high bandwidth consumption and mainly having non-compressed I/O may be moved to a peer node.

If the computing device determines that there is an imbalance in the proportions of compressed I/O data between the nodes at 320, the method proceeds to 340. Here, the computing device 140 may perform load balancing based on compressed I/O characteristics. As mentioned earlier in combination with 220, the computing device 140 may select a workload (for example, a certain virtual server) from the group of workloads on the first node at least based on characteristics of compressed data in respective I/O data of the group of workloads (for example, a group of virtual servers), and move it to the second node in the group of nodes.

The characteristics of the compressed data in the I/O data may include the proportion of the compressed data in all data and the compression ratio of the compressed data. As mentioned earlier, the computing device 140 may move a workload with a small I/O data volume but mainly having compressed data. In addition, the protocol layer compression performs compression/decompression on the data before and after data transmission. Due to the different formats of the data to be transmitted, its compressibility (in other words, compression ratio) also varies, resulting in different impacts on the resource consumption of the nodes. When selecting the workload to be moved, the computing device 140 may also take into account the compression ratio of the compressed I/O data for a specific node.

Taking the compression of GZIP format data as an example, due to the fact that the GZIP data itself has already been compressed, nodes will make a plurality of invalid compression attempts in the protocol layer compression process. The compression attempts have little effect on the size of the data, but result in more CPU cycles, thus consuming more compression resources. The following is an example test result of compressing datasets with different data compression ratios.

TABLE 1

| Data Type | Data Size | Compressed Size | Compression Ratio | Compression Time Consumption |
|---|---|---|---|---|
| All zero data | 3 GB | 3 MB | 1000 | 16 seconds |
| Text log data | 3 GB | 156 MB | 20 | 31 seconds |
| Video data | 3 GB | 2.8 GB | 1.07 | 110 seconds |
| Compressed data | 3 GB | 3 GB | 1 | 120 seconds |

From Table 1, for datasets of the same size, a dataset with a lower compression ratio takes longer time to be compressed and a higher CPU load. In addition, both raw data and compressed data need to be stored in a memory in the compression process, and therefore, data with a lower compression ratio may also consume more memory. Therefore, the computing device 140 may select a workload to be moved in a manner that distributes I/O data with various compression ratios more evenly between nodes.

In a dual-node system, the computing device 140 may move the selected workload to a peer node. In a system that includes more nodes, the computing device 140 may select, based on respective resource consumption of a plurality of nodes and characteristics of compressed data in their I/O data, a peer node to move a workload thereto.

After executing the action of 340, the method 300 proceeds to 350, and the computing device 140 may once again determine whether the CPU usage rates are balanced between the nodes (and in some embodiments, whether bandwidth usage or another resource consumption is balanced). In a load balancing process, the computing device 140 may perform a plurality of rounds of iterations, considering the distribution of I/O compressed data in each round of iteration until resource consumption between nodes reaches a balance.

Then, the method 300 ends at 360, and the computing device 140 may wait for the next load balancing evaluation. Due to the dynamic change of the connection between the client and the node, the resource usages between nodes may change over time, leading to the recurrence of an imbalance. At a predetermined interval, or in response to an instruction from an administrator, the computing device 140 may perform the method 300 again.

Using the method 300, using the load balancing based on the characteristics of compressed I/O data in combination with the bandwidth-based load balancing can comprehensively evaluate and alleviate the load imbalance between nodes caused by various factors including the protocol layer compression, thereby improving the overall system performance of the multi-node system.

Figure 4A:
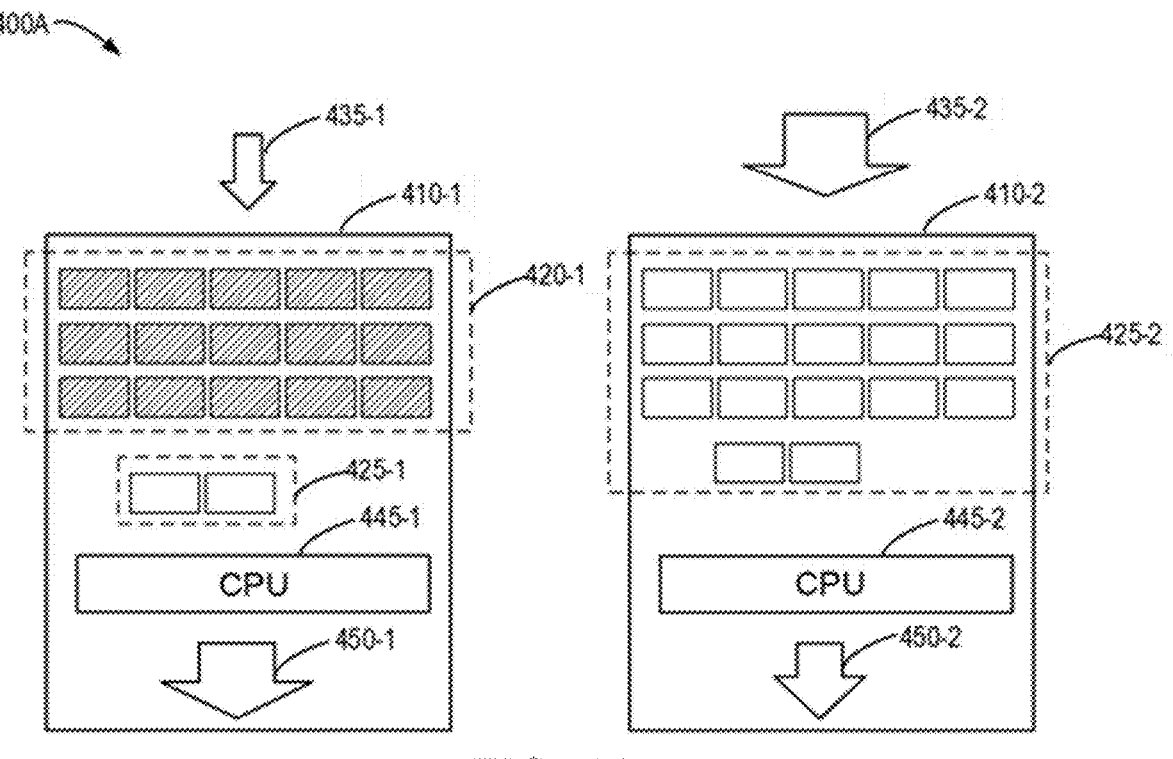
FIG. 4A to FIG. 4B show example load distributions before and after load balancing is performed according to some embodiments of the present disclosure.
Figure 4B:
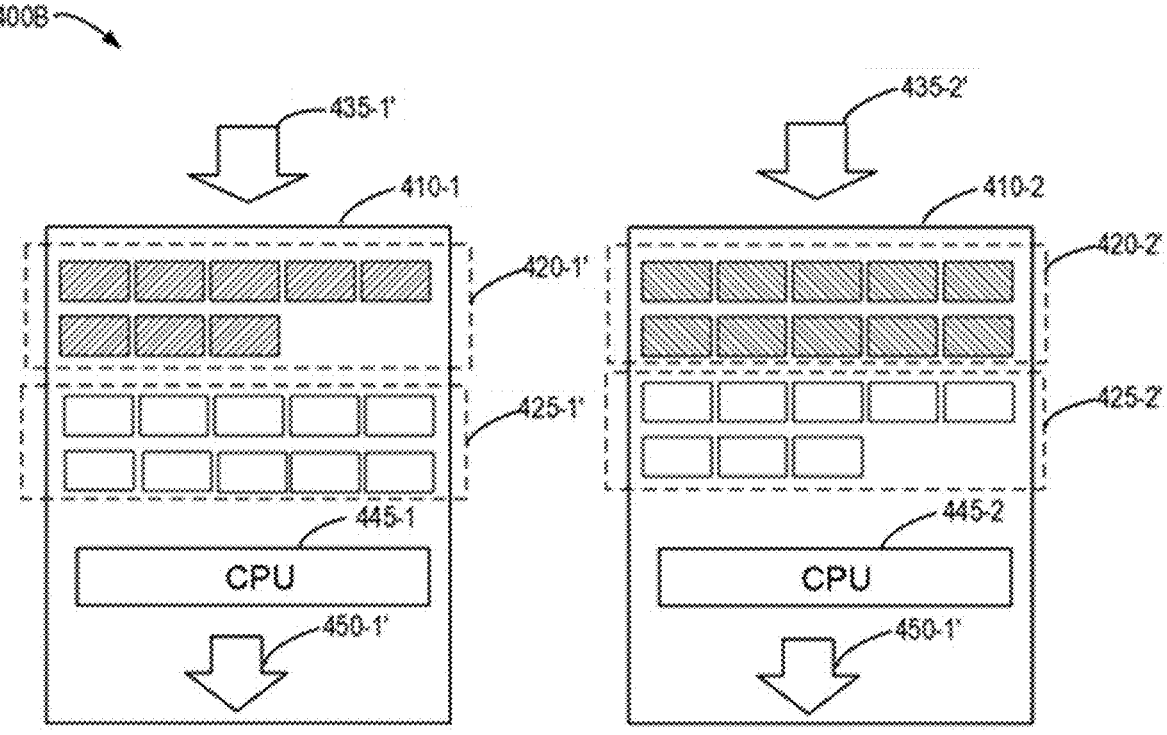

Referring now to FIG. 4A to FIG. 4B, which show example load distributions of nodes before and after load balancing is performed according to some embodiments of the present disclosure. It should be understood that the element sizes depicted in FIG. 4A to FIG. 4B are only illustrative and not an accurate quantitative description.

Furthermore, although a dual-node system is used as an example in FIG. 4A to FIG. 4B, the method of the embodiments of the present disclosure is also applicable to a scenario with more nodes.

As a non-limiting example, FIG. 4A to FIG. 4B show a dual-node storage system including two storage processing nodes (also referred to as storage processors (SPs) herein) 410-1 and 410-2. A group of workloads may run on each node, for example, as indicated by a plurality of rectangles labeled 420-1, 425-1, and 425-2 in the accompanying drawing. In the non-limiting example, the storage system uses a Virtual Data Mover (VDM), wherein each rectangle of the plurality of rectangles indicated by the reference numerals represents a VDM.

The VDM may be considered as a logical Network-Attached Storage (NAS) server, which is used for grouping environments and services of a Common Internet File System (CIFS) and/or Network File System (NFS) into virtual containers. The VDM, also known as a Shared Folder Server (SFS), provides network features, including IP addresses, DNS, and routing, for shared file folders. A client I/O for a given IP address will be sent to a VDM corresponding to the IP.

The VDM is only active on one storage node. On the nodes 410-1 and 410-2, some VDMs provide services to a client with protocol layer compression enabled, while others do not enable the protocol layer compression. In addition, the client may also independently decide whether to use the protocol layer compression during data transmission. These reasons make the compression computing workload between the nodes 410-1 and 410-2 unbalanced.

As shown in FIG. 4A, the node 410-1 includes a large number of VDMs with mainly compressed data in the I/O, such as those VDM indicated by 420-1, while there are fewer VDMs with mainly non-compressed data in the I/O indicated by 425-1. As a result, the bandwidth overhead for the frontend of the node 410-1 to capture I/O is not significant (as shown in 435-1), but the backend implicates a lot of compression and decompression, resulting in a high usage rate of a CPU 445-1 and a high backend I/O overhead (as shown in 435-2).

In contrast, the node 410-2 includes VDMs with mainly non-compressed data in the I/O, as shown in 425-2. The bandwidth overhead for its frontend to capture I/O is high (as shown in 435-2), but a usage rate of its CPU 445-2 and the backend I/O overhead (as shown in 450-2).

The load balancing method according to the embodiment of the present disclosure may be applied to the example scenario to determine whether the corresponding VDM should be placed on a peer node to balance the workload. As shown in FIG. 4B, after load balancing is performed, the load distribution related to protocol layer compression on the node 410-1 and the node 410-2 becomes more uniform. Some VDMs with high compression data proportions in I/O are moved from the node 410-1 to the node 410-2, while some VDMs with low compression data proportions in I/O are moved from the node 410-2 to the node 410-1, as indicated by the corresponding reference numerals 420-1', 425-1', 420-2', and 425-2'. Furthermore, the frontend and backend I/O bandwidth overheads of the two nodes will also become balanced, as indicated by the corresponding reference numerals 435-1', 450-1', 435-2', and 450-1'. In addition, the usage rates of the CPU 445-1 and the CPU 445-2 will also be more balanced, as will be explained below with reference to FIG. 5A to FIG. 5B.

Figure 5A:
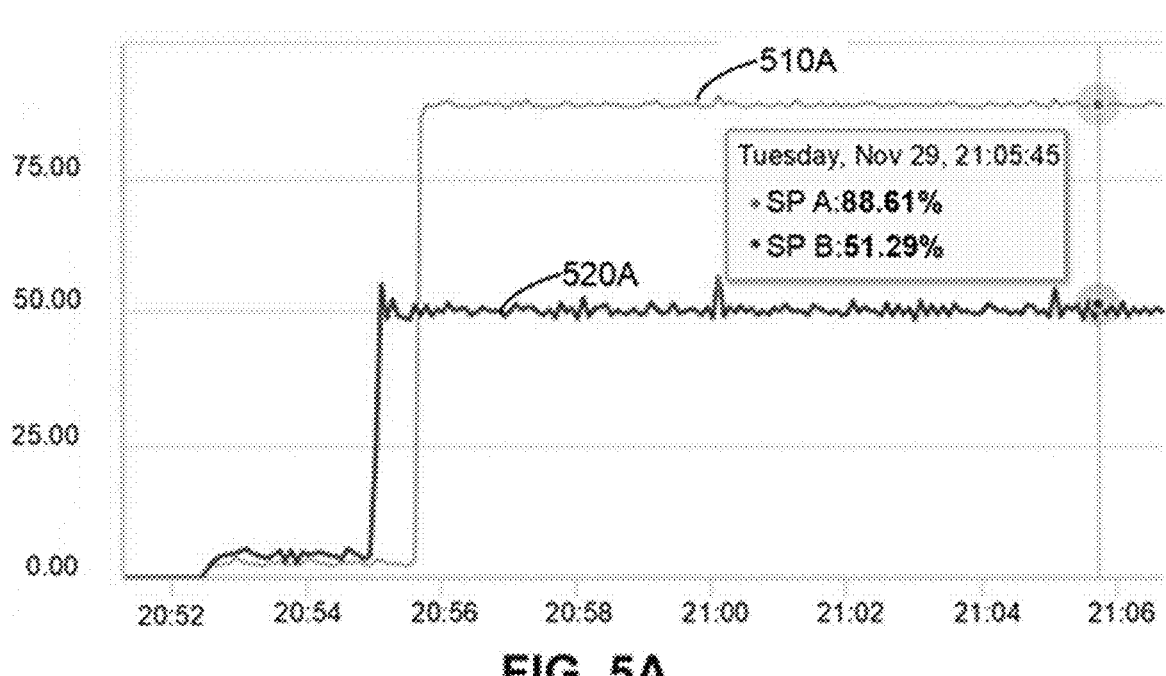
FIG. 5A to FIG. 5B show example node CPU usage rates before and after load balancing is performed according to some embodiments of the present disclosure.
Figure 5B:
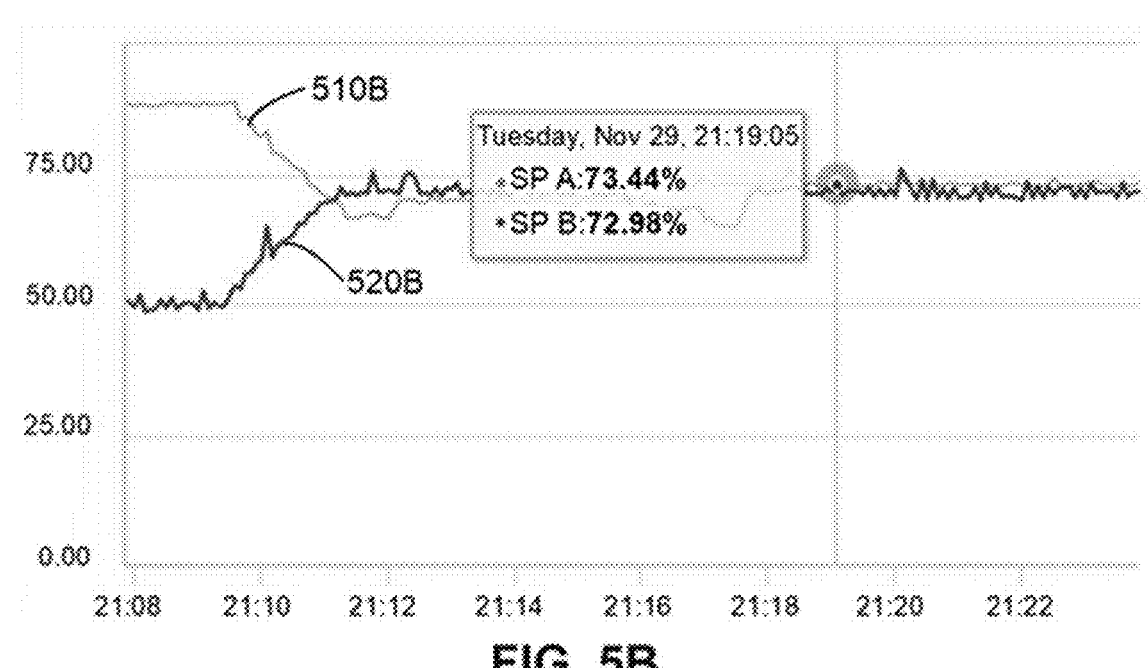

FIG. 5A and FIG. 5B show curve graphs of CPU usage rates of example nodes before and after load balancing is performed in the example dual-node system shown in FIG. 4A and FIG. 4B, respectively. In these curve graphs, horizontal axes represent time and vertical axes represent CPU usage rate.

In the example, FIG. 5A may correspond to the CPU usage of the node before load balancing is performed in FIG. 4A. A curve 510A reflects a CPU usage rate of a node SP A before load balancing is performed, and the curve 510A reflects a CPU usage rate of a node SP B at the same time. In the example, the node SP A and the node SP B may correspond to the node 410-1 and the node 410-2 in FIG. 4A to FIG. 4B, respectively. As can be seen from FIG. 5A, the CPU usage rate of SP A is significantly higher than that of SP B, and there is an imbalance in resource consumption between the two nodes. As mentioned earlier, if only bandwidth-based load balancing is used at this point, it may actually intensify the CPU overload of the node SP A with a large volume of compressed I/O.

FIG. 5B may correspond to the CPU usage of the node after load balancing is performed according to the embodiment of the present disclosure in FIG. 4B. As mentioned earlier, in load balancing, compression I/O related characteristics of nodes are taken into account. A curve 510B reflects a CPU usage rate of the node SP A after load balancing is performed, and the curve 510B reflects a CPU usage rate of the node SP B at the same time. As can be seen from FIG. A, after load balancing is performed, the CPU usage rates of the two nodes become similar and reach a balanced state.

Figure 6:
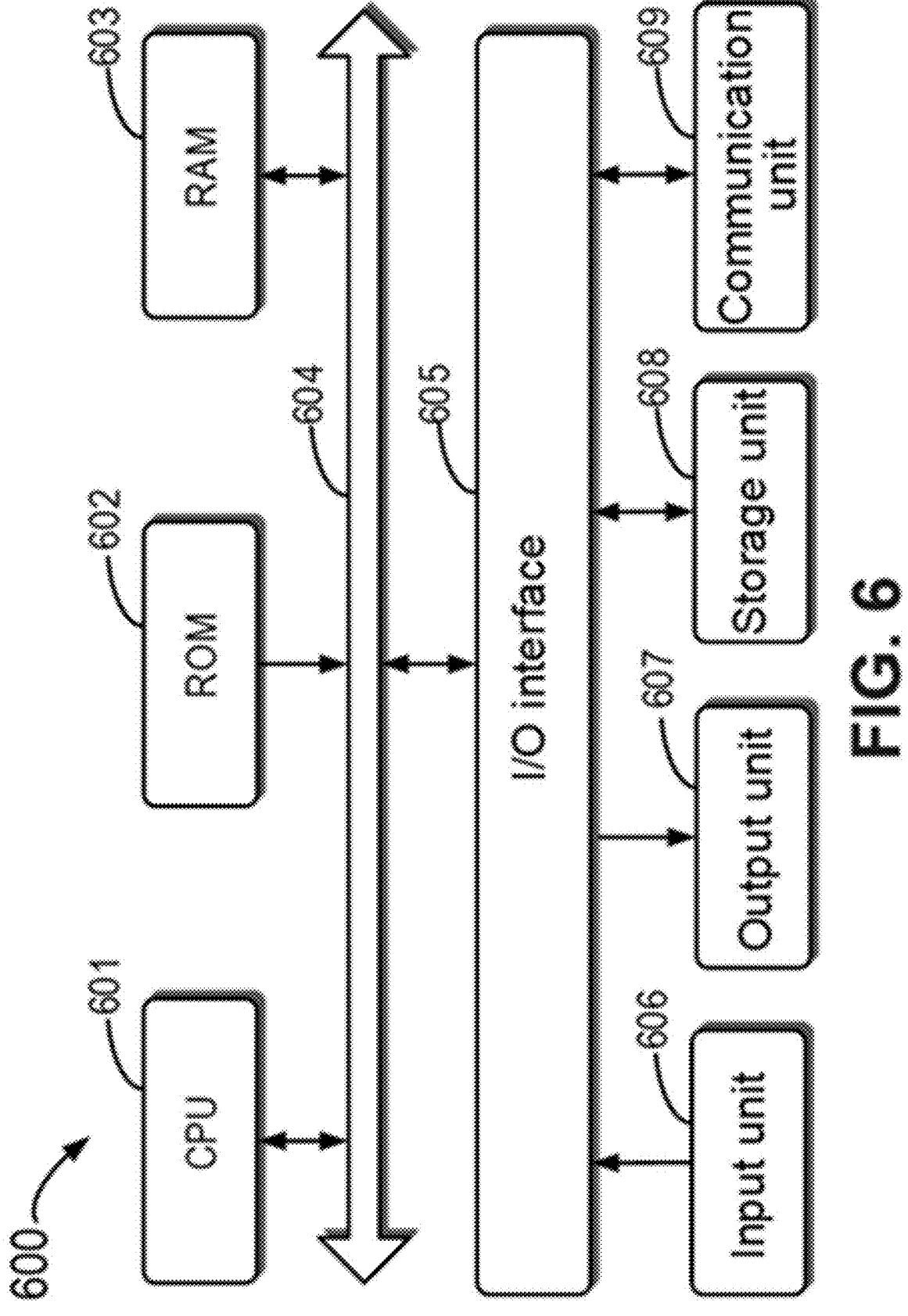
FIG. 6 shows a schematic block diagram of a device that can be used for implementing embodiments of the present disclosure.

FIG. 6 illustrates a schematic block diagram of a device 600 that may be used to implement embodiments of the present disclosure. The device 600 may be a device or apparatus as described in embodiments of the present disclosure. As shown in FIG. 6, the device 600 includes a central processing unit (CPU) 601 that can perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604. Although not shown in FIG. 6, the device 600 may also include a co-processor.

Multiple components in the device 600 are connected to the I/O interface 605, including: an input unit 606, such as a keyboard, a mouse, and the like; an output unit 607, such as various types of displays, speakers, and the like; the storage unit 608, such as a magnetic disk, a compact disc, and the like; and a communication unit 609, such as a network card, a modem, a wireless communication transceiver, and the like. The communication unit 609 allows the device 600 to exchange information/data with other devices via a computer network, such as the Internet, and/or various telecommunication networks.

The various methods or processes described above may be performed by the processing unit 601. For example, in some embodiments, the methods may be implemented as a computer software program that is tangibly included in a machine-readable medium such as the storage unit 608. In some embodiments, part of or all the computer program may be loaded and/or installed onto the device 600 via the ROM 602 and/or the communication unit 609. When the computer program is loaded onto the RAM 603 and executed by the CPU 601, one or more steps or actions of the methods or processes described above can be performed.

In some embodiments, the methods and processes described above may be implemented as a computer program product. The computer program product may include a computer-readable storage medium on which computer-readable program instructions are loaded for performing various operations or acts of the present disclosure.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various operations or acts of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various operations or acts of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions denoted in the blocks may also occur in an order different from that denoted in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

The embodiments of the present disclosure have been described above. The foregoing description is illustrative rather than exhaustive, and is not limited to the embodiments disclosed. Numerous modifications and alterations are apparent to those of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

What is claimed is:

1. A method, comprising:

in response to a difference between a first central processing unit (CPU) usage rate of a first node in a group of nodes and a second CPU usage rate of a second node in the group of nodes being determined to exceed a first threshold, determining, by a system comprising at least one processor, whether a proportion difference between a first proportion of compressed data in a first input/output (I/O) data of the first node and a second proportion of compressed data in a second I/O data of the second node in the group of nodes exceeds a second threshold;

in response to the proportion difference being determined to exceed the second threshold, selecting a first workload from a first group of workloads on the first node based on characteristics of compressed data in the respective I/O data of the first group of workloads; and based on selecting the first workload, moving the first workload from the first node to another node in the group of nodes other than the first node.

2. The method of claim 1, wherein a workload in the first group of workloads corresponds to a virtual server in a group of virtual servers, and wherein the moving of the first workload to the other node in the group of nodes comprises:

moving the virtual server corresponding to the first workload to the other node in the group of nodes.

3. The method of claim 1, wherein a workload in the first group of workloads corresponds to a first connection between a client and the first node, and wherein the moving of the first workload to the other node in the group of nodes comprises:

changing the first connection with the first node corresponding to the first workload to a second connection with the other node.

4. The method of claim 1, further comprising, after the moving of the first workload to the other node in the group of nodes:

in response to a difference between a first bandwidth occupation of the other node and a second bandwidth occupation of a third node in the group of nodes being determined to exceed a third threshold, selecting a second workload from a second group of workloads on the other node based on characteristics of compressed data in the respective I/O data of the second group of workloads; and moving the second workload to one of the other nodes in the group of nodes.

5. The method of claim 4, wherein the selecting of the second workload comprises:

in response to a time length elapsed after the first workload is moved to the other node being determined to be less than a threshold time length, excluding the first workload from candidates applicable to the second workload.

6. The method of claim 1, further comprising:

in response to the proportion difference being determined to exceed the second threshold, selecting a second workload from the first group of workloads based on the characteristics of the compressed data in the respective I/O data of the first group of workloads; and moving the second workload to a third node in the group of nodes.

7. The method of claim 1, further comprising:

in response to the proportion difference being determined not to exceed the second threshold, selecting the first workload from the first group of workloads based on bandwidth occupations of the workloads in the first group of workloads; and based on selecting the first workload, moving the first workload to the other node in the group of nodes.

8. The method of claim 1, further comprising:

recording, within a defined time period, sizes of uncompressed data, compressed sizes of compressed data, and original sizes of the compressed data before compression transmitted by I/O requests associated with the respective nodes in the group of nodes; and determining the proportion difference based on the sizes of the uncompressed data, the compressed sizes of the compressed data, and the original sizes of the compressed data.

9. A device, comprising:

at least one processor; and at least one memory coupled to the at least one memory processor, wherein the at least one memory has executable instructions stored therein, and the executable instructions, when executed by the at least one processor, cause the device to perform actions comprising:

determining, in response to a difference between a first central processing unit (CPU) usage rate of a first node in a group of nodes and another CPU usage rate of another node in the group of nodes exceeding a first threshold, whether a proportion difference between a first proportion of compressed data in a first input/output (I/O) data of the first node and a second proportion of compressed data in a second I/O data of the other node in the group of nodes exceeds a second threshold;

selecting, in response to the proportion difference exceeding the second threshold, a first workload from a first group of workloads on the first node based on characteristics of compressed data in the respective I/O data of the first group of workloads; and moving the first workload to a second node in the group of nodes.

10. The device of claim 9, wherein a workload in the first group of workloads corresponds to a virtual server in a group of virtual servers, and wherein the moving of the first workload to the second node in the group of nodes comprises:

moving a virtual server corresponding to the first workload to the second node in the group of nodes.

11. The device of claim 9, wherein a workload in the first group of workloads corresponds to a first connection between a client and the first node, and wherein the moving of the first workload to the second node in the group of nodes comprises:

changing the first connection with the first node corresponding to the first workload to a second connection with the second node in the group of nodes.

12. The device of claim 9, wherein the actions further comprise, after the moving of the first workload to the second node in the group of nodes:

selecting, in response to a difference between a bandwidth occupation of the second node and a bandwidth occupation of a different node in the group of nodes exceeding a third threshold, a second workload from a second group of workloads on the second node based on characteristics of compressed data in the respective I/O data of the second group of workloads; and moving the second workload to the different node in the group of nodes.

13. The device of claim 12, wherein the selecting of the second workload comprises:

excluding, in response to a time length elapsed after the first workload is moved to the second node being less than a threshold time length, the first workload from candidates of the second workload.

14. The device of claim 9, wherein the actions further comprise:

selecting, in response to the proportion difference not exceeding the second threshold, the first workload from the first group of workloads based on bandwidth occupations of the workloads in the first group of workloads.

15. The device of claim 9, wherein the actions further comprise:

moving the first workload to the second node in the group of nodes.

16. The device of claim 9, wherein the actions further comprise:

recording, within a predetermined time period, sizes of uncompressed data, compressed sizes of compressed data, and original sizes of the compressed data before compression transmitted by I/O requests associated with nodes in the group of nodes; and determining the proportion difference based on the sizes of the uncompressed data, the compressed sizes of the compressed data, and the original sizes of the compressed data.

17. A computer program product, the computer program product being stored on a non-transitory computer-readable medium and comprising machine-executable instructions, wherein the machine-executable instructions, when executed, cause a machine to perform actions comprising:

determining, in response to a difference between a first central processing unit (CPU) usage rate of a first node in a group of nodes and a second CPU usage rate of another node in the group of nodes being determined to exceed a first threshold, whether a proportion difference between a first proportion of compressed data in a first input/output (I/O) data of the first node and a second proportion of compressed data in a second I/O data of the other node in the group of nodes exceeds a second threshold;

selecting, in response to the proportion difference being determined to exceed the second threshold, a first workload from a first group of workloads on the first node based on characteristics of compressed data in the respective I/O data of the first group of workloads; and moving the first workload to a second node in the group of nodes.

18. The computer program product of claim 17, wherein the actions further comprise, after the moving of the first workload to the second node in the group of nodes:

selecting, in response to a difference between a bandwidth occupation of the second node and a bandwidth occupation of a third node in the group of nodes being determined to exceed a third threshold, a second workload from a second group of workloads on the second node based on characteristics of compressed data in the respective I/O data of the second group of workloads; and moving the second workload to the third node in the group of nodes.

19. The computer program product of claim 18, wherein the third node is the first node, and wherein the selecting of the second workload comprises:

excluding, in response to a time length elapsed after the first workload is moved to the second node being determined to be less than a threshold time length, the first workload from candidates of the second workload.

20. The computer program product of claim 17, wherein the actions further comprise:

selecting, in response to the proportion difference being determined to exceed the second threshold, a second workload from the first group of workloads based on the characteristics of the compressed data in the respective I/O data of the first group of workloads; and moving the second workload to a third node in the group of nodes.

\* \* \* \* \*